(12) United States Patent
Côté

(10) Patent No.: US 6,731,302 B1
(45) Date of Patent: May 4, 2004

(54) METHOD AND APPARATUS FOR CREATING FACIAL IMAGES

(75) Inventor: Pierre Côté, St-Charles-sur-Richelieu (CA)

(73) Assignee: IQ Biometrix, Inc., Fremont, CA (US)

( * ) Notice: Subject to any disclaimer, the term of this patent is extended or adjusted under 35 U.S.C. 154(b) by 0 days.

(21) Appl. No.: 09/087,599

(22) Filed: Apr. 29, 1998

(30) Foreign Application Priority Data

Apr. 29, 1998 (CA) ............................................. 2236388

(51) Int. Cl.[7] .............................................. G06T 11/80
(52) U.S. Cl. ....................................... 345/619; 345/646
(58) Field of Search ................................. 345/433, 441, 345/435, 473, 432, 430, 442, 443, 444, 423, 424, 428, 581, 582, 583, 626, 619, 646, 647, 648, 469.1, 470, 635, 629

(56) References Cited

U.S. PATENT DOCUMENTS

| | | | |
|---|---|---|---|
| 5,214,758 A | | 5/1993 | Ohba et al. |
| 5,267,154 A | | 11/1993 | Takeuchi et al. |
| 5,375,195 A | | 12/1994 | Johnston |
| 5,459,830 A | | 10/1995 | Ohba et al. |
| 5,537,662 A | * | 7/1996 | Sato et al. ................ 345/435 |
| 5,563,992 A | | 10/1996 | Murata et al. |
| 5,600,767 A | | 2/1997 | Kakiyama et al. |
| 5,644,690 A | * | 7/1997 | Yoshino et al. ............ 345/435 |
| 5,649,086 A | * | 7/1997 | Belfer et al. ............... 345/441 |
| 5,680,531 A | * | 10/1997 | Litwinowicz et al. ...... 345/473 |

FOREIGN PATENT DOCUMENTS

WO      WO 94/08311      4/1994

* cited by examiner

Primary Examiner—Matthew Luu
Assistant Examiner—Thu-Thao Havan
(74) Attorney, Agent, or Firm—Fleshner & Kim, LLP (57) ABSTRACT

The invention relates to a method and an apparatus for creating facial images, more particularly to a composite picture system and method utilising a library of basic facial components. In typical composite picture systems, the process of creating facial images includes the steps of selecting various facial components, herein designated as basic morphological elements, from a library and assembling them. The novel method comprises the introduction of a component calibration step allowing the different basic morphological elements of a facial image to be merged into a single synthetic facial image with proportional components. A universal skin tone, created using a set of filters on the original images, is also used to reduce the contrasts between the individual basic morphological elements. In addition, each basic morphological element is encoded and uniquely describes each facial image. The use of the encoding facilitates the transmission of such images requiring only the code to be sent. The invention further provides a computer readable medium comprising a library of basic morphological elements and a program element that direct a computer to implement the composite picture process.

16 Claims, 6 Drawing Sheets

METHOD AND APPARATUS FOR CREATING FACIAL IMAGES

FIELD OF THE INVENTION

This invention relates to a system for creating facial images. It is applicable to the creation of composite pictures, specifically to systems used in law enforcement, artistic creations, recreation and education.

BACKGROUND OF THE INVENTION

Human facial characteristics can convey a large amount of information and are a very common means for quickly identifying individuals. These facial characteristics are particularly useful in the area of law enforcement where composite facial images are often used to identify criminal suspects. They are also useful to create portraits in cases where no picture of the person to be graphically described is available.

Traditionally, these composite pictures are created by graphic artists who confer with an eyewitness. Through lengthy trial and error sessions, attempts are made to create a composite picture of a suspect.

The traditional method described above presents two problems. The first is that the accuracy of a composite picture is related to the graphic artist's ability to translate the description of an eyewitness into an image. During the process, the memory of an eyewitness may be inadvertently altered by comments from the artist or from other third parties resulting in a less than accurate portrait of the suspect. The second problem with the traditional method is the high labor costs associated with the graphic artists themselves. Because police departments, in particular those in large urban centers, are likely to require several of such composite pictures, the associated labor costs are significant. Consequently, in order to overcome these problems, numerous attempts have been made to permit the witnesses to create the facial image with little or no interference from third parties. In addition to limiting the influence of a third party on the witness, the labor costs associated with the creation of composite pictures are also reduced.

One early technique for synthesizing single images of faces involved horizontally dividing the image of a face into bands for different features of the face such as hair, eyes, nose, mouth, and chin, respectively. Paper strips containing exemplary features could then be combined to form a composite drawing of a face.

One disadvantage of these systems is the presence of discontinuities between the various bands. For example, the size of the eyes may be disproportionate with that of the head or mouth. Furthermore, the skin tone between different bands may not be identical. These discontinuities often create and image which is cartoon-like and which bears little resemblance to the real life image the user of the system may wish to create.

Other techniques involve selecting individual components and combining them on a pre-selected face. In a typical interaction, the user first selects the shape of the face then eyes, nose, mouth and other components and combines them to form a facial image. Many variations on this theme can be used as described in Kakiyama et al. U.S. Pat. No. 5,600,767, Yoshino et al. U.S. Pat. No. 5,644,690, Sato et al. U.S. Pat. No. 5,537,662 and Belfer et al. U.S. Pat. No. 5,649,086 whose contents are hereby incorporated by reference. For example, the Sato et al. Patent, entitled Electronic Montage composing apparatus, describes a system for creating a montage image of a face using a plurality of basic parts stored in a library. In a typical interaction, the user selects a basic face from a plurality of basic faces and replaces the parts of the face in order to obtain the desired final result. Only the parts that are different from the ones desired need to be modified. This allows the user to quickly obtain a facial image without requiring the selection of each individual part. The Belfer et al. Patent describes another variation on this combination of individual components. This invention includes a database of exemplar images, or model components, which are stored and indexed according to various characteristics. Images are created by interpolating among the exemplar images in the database based on user selection of parameter values. Examples of high level parameters are gender and expression (surprise, anger). Examples of low level parameters are nose length, nostril width, hair thickness and so on. This system allows storing a reduced number of components by producing combinations of the components through interpolation. By allowing the user to vary parameters across a range of extreme values, facial images with the desired appearance can be created.

Although the use of individual components allows the user to position them at the desired location on the face, the proportions of the components often remains unsatisfactory. Furthermore, discontinuities remain and are often significant particularly when the facial images created comprise components selected from various genders and races. Furthermore in the case of the Belfer et al. Patent, tuning the parameters to obtain the desired appearance may be lengthy and difficult to master for the inexperienced user requiring the presence of an experienced technician.

Thus, there exists a need in the industry to refine the process of creating facial images such as to obtain a better composite picture system particularly applicable to law enforcement, artistic creations, recreational use and education.

OBJECTS AND STATEMENT OF THE INVENTION

An object of the invention is to provide a novel method and an apparatus for creating facial images.

Another object of this invention is to provide a computer readable storage medium containing a novel program element that directs a computer to perform the creation of a facial image.

Another object of this invention is to provide a computer readable storage medium containing novel library of basic morphological elements.

Another object of this invention is to provide a novel method for creating a library of basic morphological elements.

As embodied and broadly described herein the invention provides an apparatus for generating a composite facial image, said apparatus comprising:

machine-readable storage medium for storing a set of data elements, said data elements being representative of basic morphological elements, said data elements being in a format such that graphical representations of the basic morphological elements associated with the data elements are proportionate to one another;

an input for receiving user data indicative of a plurality of data elements;

processing means in operative relationship with said machine-readable storage medium for processing the plurality of data elements to provide a digital representation of a facial image resulting from a combination of the basic morphological elements associated with the plurality of data elements.

For the purpose of the specification, the expressions "morphological element", "morphological component" and "basic morphological elements" are used to describe a part of a specific facial image. Examples of morphological elements are noses, eyes, mouths and eyebrows. In the preferred embodiment, morphological elements are grouped into morphological classes. For example, all nose elements are grouped into the "NOSE" morphological class and all the eye elements are grouped in the "EYE" morphological class. Optionally, the classes are divided into subclasses to further specify the types of elements stored. For example, the morphological class "MOUTH" may be subdivided into "thick lips", "narrow", "thin lips" subclasses.

For the purpose of the specification, the expression "calibrating" is used to designate the process of modifying the proportions of a set of distinct morphological components in order to improve their interaction. For example, the basic morphological elements in the library of basic morphological elements are calibrated to produce a facial image where the various parts can be connected with reduced discontinuities at their juncture. This is particularly useful when the volumes of the heads of different individuals from which the basic morphological elements were taken vary significantly.

For the purpose of the specification, the expressions "skin texture" and "skin tone" are used to designate the graphical appearance of the skin components of an image. The graphical appearance generally comprises the color shading of the skin. In the preferred embodiment a "universal" skin tone is used to facilitate the combination of different facial components by reducing the color contrasts of different skin types.

For the purpose of the specification, the expression "non-volatile storage" is used to designate a machine-readable storage unit that maintains its contents even if the storage device has no power such as non-volatile RAM (NVRAM) or a hard disk.

In a most preferred embodiment of this invention, the composite picture system creates images of a face on the basis of images of individual facial parts, herein referred to as basic morphological elements. In the preferred embodiment, the composite picture system provides two modules namely a library of basic morphological elements and an image creation and modification module interacting with the library of basic morphological elements.

The image creation and modification module provides a means for creating a facial image. In a typical interaction, once the composite picture system is activated, the user of the system selects, through an interface, basic morphological elements from the library of basic morphological elements. These basic morphological elements represent images of facial parts such as eyes, noses, hair and so on. The operator interface to the composite picture system may be a keyboard, pointing device, touch screen or any other suitable command/data input means. Preferably for a given facial image, a single basic morphological element is selected from a given morphological class. Following this, the selected basic morphological elements are combined to form a facial image. In the preferred embodiment, voids between the part forming the mosaic of basic morphological elements are uniformly filled by a predetermined texture, herein referred to as the universal skin tone. The system then displays the facial image to allow the user to view it. The display may be a computer screen, a printed image or any other suitable means for displaying the facial image to the user. If the facial image is to the user's satisfaction, the process is complete. If the facial image is not satisfying, the user may select other basic morphological elements through the user interface in order to get the desired result. Preferably, the composite picture system also includes vertical and horizontal controls allowing the user to modify the position of the basic morphological elements in the facial image. The user may modify the basic morphological elements until the image obtained is the one desired.

The second module of the composite picture system is the library of basic morphological elements. Each basic morphological element in the library is an image of a facial part or an accessory such as glasses, earrings or other. In a preferred embodiment, the basic morphological elements are collected by gathering photographs of individuals and isolating basic morphological elements. The accessories may be pictures or may be synthetically created with the use of graphing tools without detracting from the spirit of the invention. In a preferred embodiment, the system includes approximately 2,000 (two thousand) pictures of faces wherein selected individual basic morphological elements have been isolated. It is also desirable to include in the library of basic morphological elements images from both genders, images from a wide range of age groups and images from different races in order to have a good representation of the various facial characteristics of humans. Once the pictures have been collected, a processing operation is performed. The basic morphological elements are isolated and grouped according to the facial part they represent herein referred to as morphological class. In the preferred embodiment, the following basic morphological classes have been used: hairstyle, forehead, eyebrows, eyes, nose, mouth, chin, moustache, beard, wrinkles and glasses. Following this, a sequence of operations is performed on each individual basic morphological element in order to allow the facial parts to be compatible one with the other. As a first step the skin of the images are modified so all the skin parts of the basic morphological elements have a common skin tone herein referred to as universal skin tone. A filter operation may be applied to either darken the skin tone or lighten the skin tone. In the preferred embodiment, the facial image is created in a gray shade and the universal skin tone is a predetermined shade of gray. Preferably, the shade of gray is chosen such that it is neither dark nor pale such as to be able to represent a wide range of skin types. The selection of the shade of gray is subjective and depends on the preference of the designer and user. The basic morphological elements are then mapped onto a universal skin tone background. The following step involves a calibration operation of the basic morphological elements. This is of particular importance since the volume of the head of different individuals is variable. The variation in volume often creates discontinuities around the facial edges and the calibration step permits a reduction or elimination of these discontinuities. The calibration may also include positioning critical points in the facial image such as the eyes, nose, mouth and others at a predetermined position and interpolating the pixels in between the critical points. Once the calibration is complete, the basic morphological elements are cut into a shape suitable for use in the composite picture system. Optionally, once the processing operation has been completed, each basic morphological element is assigned a unique identifier, herein referred to as element code.

Typically, this identifier is a sequence of alphanumeric characters. A facial code for a facial image is created by combining the identifiers of the basic morphological elements constituting the facial image. The combination may be a concatenation of the element codes or any other means of combining the identifiers provided that the resulting facial code is unique to that set of basic morphological elements and their coordinates. The facial code allows each facial image to be described with a very small number of characters permitting the rapid transmission of the composite picture over data lines. For example, a police station A using the facial code can transmit the entire composite picture of a suspect to police station B by simply sending the code for that facial image. At the reception, police station B enters the code into the composite picture system that displays the composite picture. The communication between location A and location B may be a telephone line with a set of modems, an Ethernet connection or any other communication means suitable for the transfer of data.

In another preferred embodiment of the invention, the apparatus for creating facial images is integrated into a non-electronic composite picture system using a library of basic morphological elements in the form of physical modules on transparencies. The composite picture system provides two modules namely a library of basic morphological elements and an image combination fixture for holding the transparencies in a superposed relationship such that the morphological elements as the transparencies visually unite with one another to form a complete facial image.

The image combination fixture provides a handy tool for combining the basic morphological elements to create a facial image. In a typical interaction, the user selects a set of transparencies containing images of basic morphological elements from a library of basic morphological elements. These basic morphological elements represent images of facial parts such as eyes, noses, hair and so on. Following this, the selected basic morphological elements are combined to form a facial image. Typically the combination is done by superposing the selected transparencies in an order appropriate for the correct visioning of the image. The image combination fixture may be a simple tray designed to hold the transparencies in the proper alignment. As a variant, an overhead projector can be used with the transparencies to display the combined result on a screen. If the facial image is to the user's satisfaction, the process is complete. If the facial image is not satisfying, the user may add a transparency or replace one of those selected previously until the desired result is obtained. Preferably, the vertical and horizontal coordinates of the basic morphological elements in the facial image can be changed by sliding the transparencies in the fixture or over the projector to the correct position.

In the preferred embodiment, the non-electronic composite picture system comprises a library of basic morphological elements. In the preferred embodiment, the basic morphological elements are collected by gathering photographs of individuals and isolating basic morphological elements. Once the basic morphological elements have been collected a processing operation is performed. In order to facilitate the processing operation, it is preferable to perform the processing operation with a general-purpose digital computer and to print the results on transparencies. The processing operation preferably includes the step of calibrating the basic morphological elements in order to allow the facial parts to be compatible one with the other and the step of modifying the skin tone of all the skin parts of the basic morphological elements such that the skin tone is uniform throughout the library. Optionally, once the processing operation has been completed, each basic morphological element is assigned a unique identifier. The coordinate part of the identifier is measure from the center point of the transparency and is the displacement with respect to a fixed point. Other methods for measuring the position of the transparencies may be used without detracting from the spirit of the invention. The facial code for a facial image may then be created by combining the identifiers.

As embodied and broadly described herein, the invention provides a method for generating a composite facial image, said method comprising the steps of:

providing a machine-readable storage medium for storing a set of data elements, said data elements being representative of basic morphological elements, said data elements being in a format such that graphical representations of the basic morphological elements associated with the data elements are proportionate to one another;

receiving user data indicative of a selection of a plurality of data elements;

processing the plurality of data elements to provide a digital representation of a facial image resulting from a combination of the basic morphological elements associated with the plurality of data elements.

As embodied and broadly described herein, the invention also provides a computer readable storage medium containing a program element for directing a computer to create a facial image, said computer including:

memory means including:
a set of data elements, said data elements being representative of basic morphological elements, said data elements being in a format such that graphical representations of the basic morphological elements associated with the data elements are proportionate to one another;

processor means in operative relationship with said memory means, said program element instructing said processor means for:
receiving user data indicative of a selection of a plurality of data elements;
processing the plurality of data elements to provide a digital representation of a facial image resulting from a combination of the basic morphological elements associated with the plurality of data elements.

As embodied and broadly described herein, the invention also provides a method for generating an electronic library of basic morphological elements suitable for usage in a composite picture system, said method comprising the steps of:

providing a plurality of facial images;

digitizing said facial images;

processing the digitized facial images to create a plurality of data elements, each data element being representative of a basic morphological element of a certain facial image;

calibrating said data elements such that all basic morphological elements are substantially proportional to one another;

storing the calibrated data elements in a computer readable storage medium.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

The composite picture system in accordance with the invention creates images of a face on the basis of images of individual facial parts, herein referred to as basic morphological elements.

Figure 1:
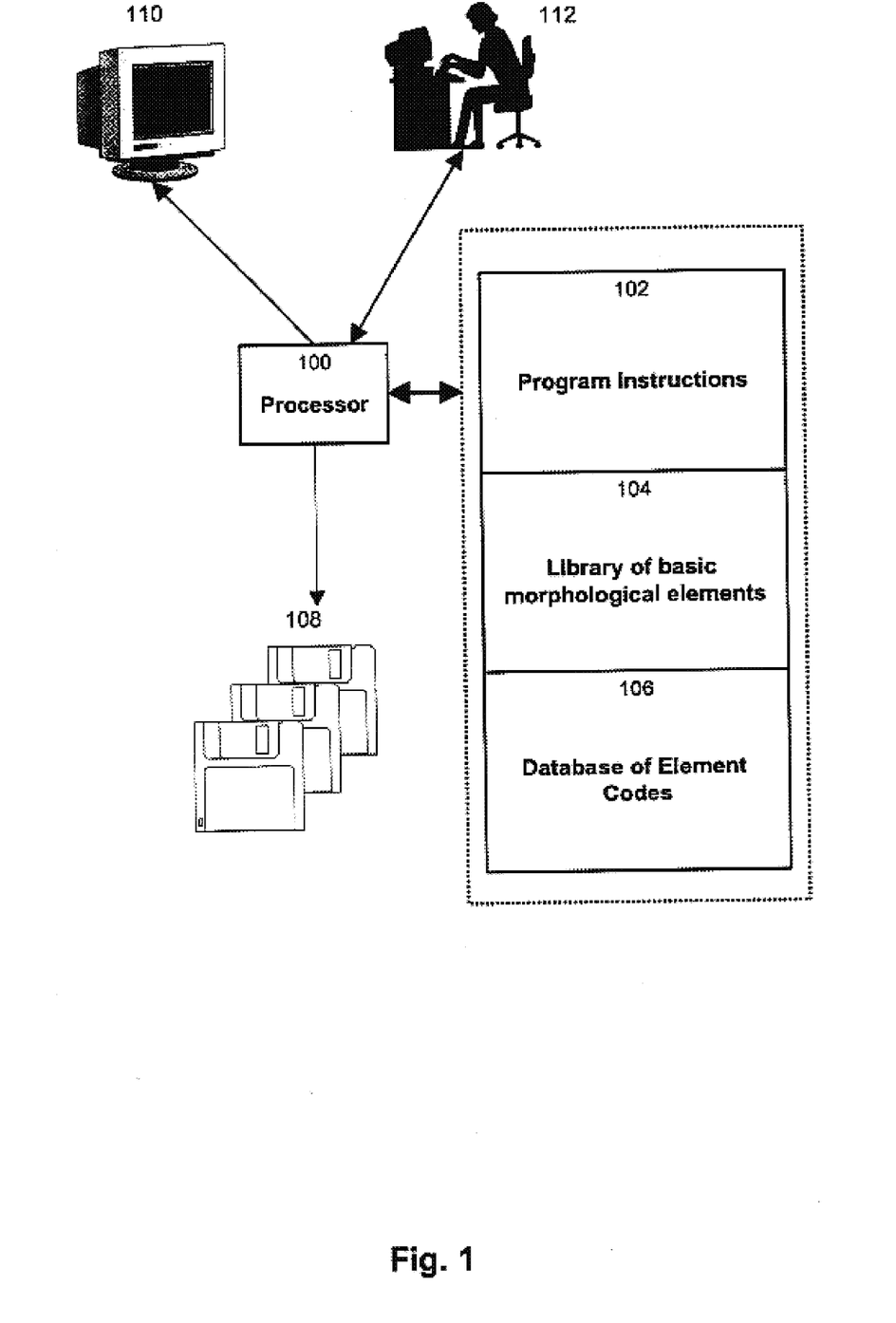
FIG. 1 shows an apparatus in accordance with an embodiment of the electronic composite picture system in accordance with the spirit of the invention.

In a preferred embodiment, as shown in FIG. 1, the system for generating a composite human face includes a general-purpose digital computer including a processor 100 linked to a machine-readable storage element 108 that may be in the form of a mass storage device such as a hard-drive, a CD-ROM or any other suitable storage medium. The system further includes a device for visualizing the facial image such as a computer monitor 110 or a printing device. The preferred embodiment also provides data input on which a user interface 112 is supported in order to allow the user to select through a touch screen, keyboard, pointing device or other input means, the individual basic morphological elements and to view the combined result on the display screen 110. The latter is likely to be part of the data input. The computer readable medium 108 storing the composite picture system includes of a set of modules namely a library of basic morphological elements 104 and program instructions 102 interacting with the library of basic morphological elements to create a facial image. Optionally, the computer readable medium 108 may also include a library of element codes 106.

Figure 6:
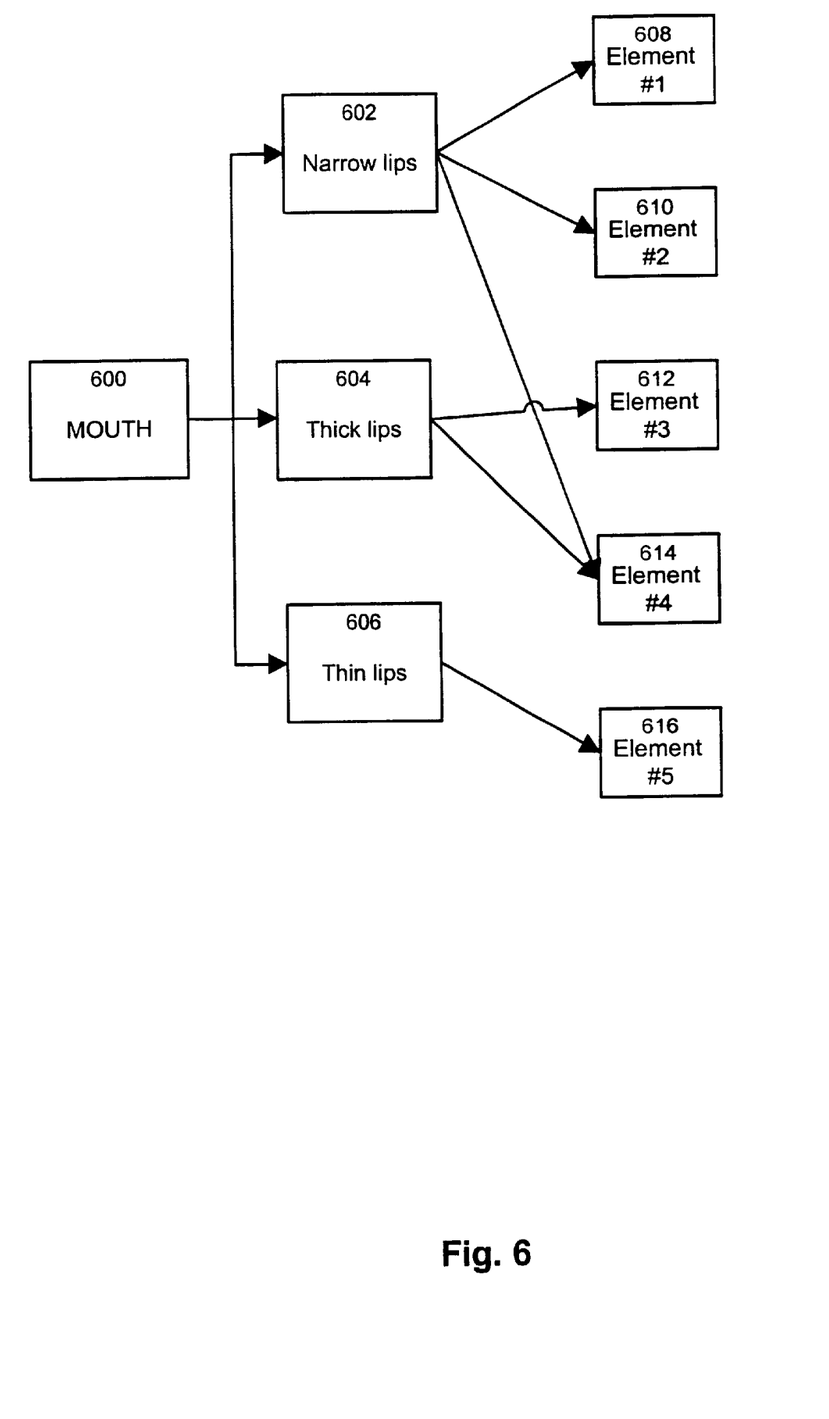
FIG. 6 shows an example of a class and subclass structure of the electronic library of basic morphological elements in accordance with the invention.

In the preferred embodiment the composite picture system comprises an electronic library of basic morphological elements 104. Each basic morphological element in the library is an image of a facial part or an accessory such as glasses, earrings or other. The basic morphological elements in the library 104 are organized into morphological classes, each class describing a part of the face. In a preferred embodiment, the following basic morphological classes are used: hairstyle, forehead, eyebrows, eyes, nose, mouth, chin, moustache, beard, wrinkles and glasses. Optionally, each basic morphological class may be further subdivided into subclasses to refine the description of the elements it contains. For example, as shown in FIG. 6, the morphological class "MOUTH" 600 may be subdivided into "thick lips" 604, "narrow lips" 602, "thin lips" 606 and so on. Each subclass contains a set of basic morphological elements 608, 610, 612, 614 and 616. A given morphological element may belong to more than a single set. The data structure implementing the class hierarchy described may include a set of pointers indicating the memory locations where the images of the basic morphological elements are stored. The use of pointers is well known in the art to which this invention pertains. For the purpose of simplicity, the description below is given in terms of classes and elements. However, the processing described below may be applied to subclasses without detracting from the spirit of the invention. Other morphological classes may be used without detracting from the spirit of the invention. It is preferable that the classes are chosen in such as to obtain a gender neutral set. The most favorable results have been found by considering eyes and eyebrows as two distinct classes.

Figure 4:
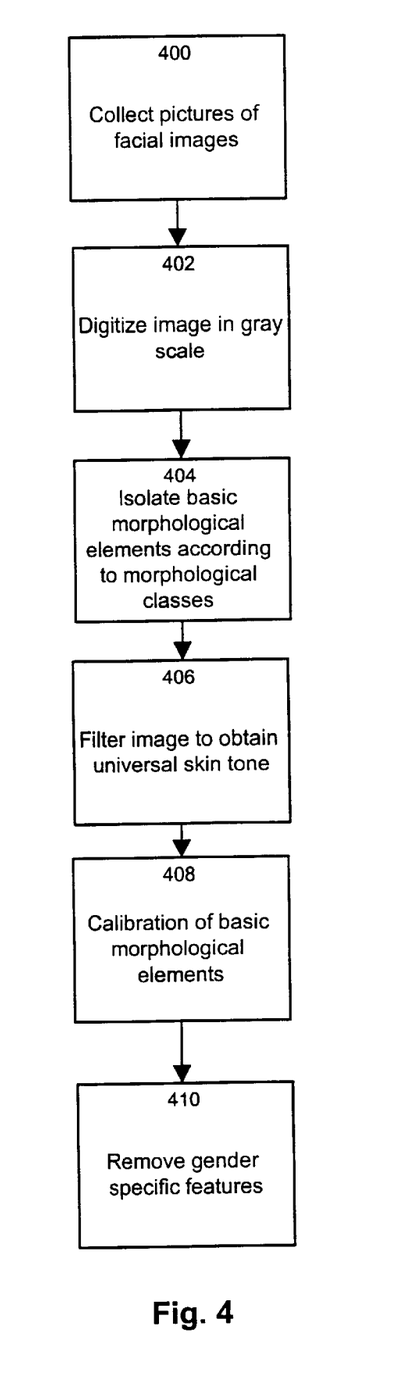
FIG. 4 shows a flow chart of an example of the process for generating the library of basic morphological elements.

In the preferred embodiment, as shown in FIG. 4, creating the library of basic morphological elements comprises a sequence of steps. The first step in the creating of the library, is the gathering of pictures of faces 400. In a preferred embodiment, a database of approximately 2,000 (two thousand) pictures of faces has been found sufficient to build a library. The pictures may be taken with any suitable device for taking photographs, specifically for the purpose of the library such as mug shots and the likes, or may be taken from other photographs such as in magazines. The accessories such as beards, glasses and so on may be pictures or may be synthetically created with the use of graphing tools without detracting from the spirit of the invention. Other sources of pictures are possible and their use does not detract from the spirit of the invention. In the preferred embodiment, pictures of individuals are taken in black in white with the same lighting and the individuals in the same position. Preferably, the faces in the pictures are directed forward, eyes open looking into the camera lens and mouth closed. Color images as well as images taken in manners differing from the ones described above may be used without detracting from the spirit of the invention. In the preferred embodiment, images from both genders, images from a wide range of age groups and images from different races are collected in order to have a good representation of the various facial characteristics of humans. The exact proportions of the images with respect to race, gender and age are not crucial to the invention as additional images may readily be added to the library.

Once the images are collected they are digitized 402. Alternatively, the images can be taken with a digital camera, thus avoiding the steps of developing films, crating hard copies and so on. Preferably the images are digitized from the negatives using a high resolution RGB digitization scheme. Other digitization schemes may be used here without detracting from the spirit of the invention. Grey scale images generally provide sufficient information on the facial characteristics and are more storage efficient and easier to manipulate than color images. The digitized images are stored on a computer readable medium such as a hard drive, disk, CDROM or other non-volatile storage medium.

Following the digitization step 402, each image is processed in order to extract basic morphological elements which are substantially proportional one to the other and which are readily combinable to yield a coherent facial image. The basic morphological elements in the facial images are isolated 404 and grouped according the morphological class to which they belong. In the preferred embodiment, the basic morphological elements are isolated by applying a mask to eliminate the parts of the face that are not needed. For example, if the eyes in a facial image are to be isolated, a mask is applied to eliminate all other components of the face leaving two circles containing the eyes. Preferably, a small amount of skin is left around the basic elements being isolated in order to avoid abrupt edges.

Once the basic morphological elements have been isolated and grouped into their respective classes 404, all skin components of the image are modified 406 so all the skin parts of the basic morphological elements have a common skin tone herein referred to as universal skin tone. The universal skin tone appearance may be a preset threshold. Preferably, the skin components are not "colored" by the universal skin tone but are rather processed and smoothed until the desired color is obtained in order to conserve the shadings of the skin. This operation may be performed through the use of filters selectively chosen to either darken or lighten the skin of the basic morphological elements in order to bring the skin tone closer to that of the universal skin tone. For example, a "burn tool" of an image processing software may be used to darken the image and a "dodge tool" may be used to lighten it. Preferably, the filters are configured to specify on which portion of the image to operate such as in the shadows, in the highlights or in the midtones. It may also bedesirable to fade parts of the image in order to eliminate edges, an operation commonly referred to as air brush. In the preferred embodiment, the facial image is created in gray scale. The universal skin tone is a predetermined shade of gray. Preferably, the shade of gray is chosen such that it is neither dark or pale such as to be able to represent a wide range of skin types. Once the skin tone of the skin components have been modified, the basic morphological element is pasted onto a background of the universal skin tone. The background preferably completely surrounds the basic morphological element.

Figure 5:
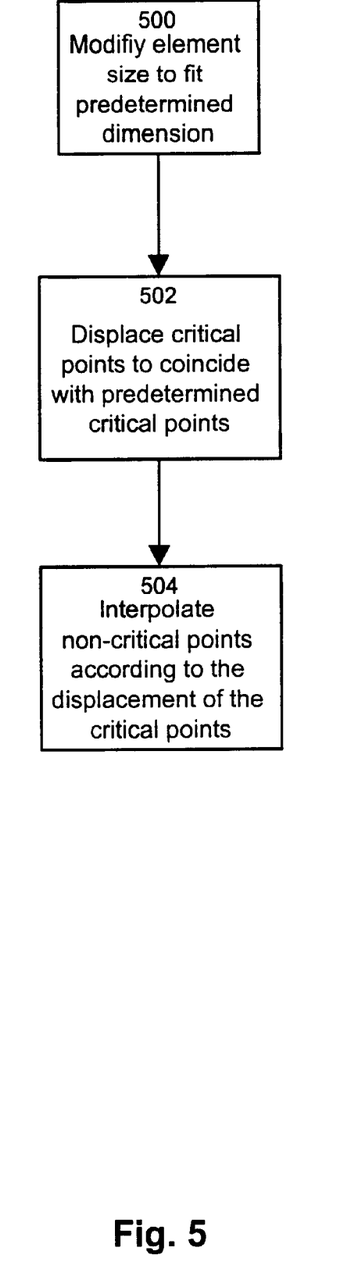
FIG. 5 shows a flowchart a process of the calibration operation in accordance with the invention.

Following the modification of skin components, each element is dimensionally calibrated 408 based on a set of pre-determined criteria. The calibration operation is of particular importance since the volume of the head and the size of the facial features of different individuals is variable. The variation in volume often creates discontinuities around the facial edges when basic morphological elements from different individuals are assembled to create a composite image. The calibration step permits a reduction or elimination of these discontinuities. For each basic morphological element in each class, a series of calibration operations are performed as shown in FIG. 5. First, the image size of each basic morphological element is modified to fit predetermined dimensions 500. The predetermined dimensions are such that elements of the various basic morphological classes are substantially proportional one to the other. More specifically, the proportions of the elements are such that the elements may be combined in a facial image that resembles a human face in terms of facial element dimensions. This operation involves warping the image and modifying pixel positions either by contracting the image or by expanding it. Warping is well known in the art of computer graphics and imaging and there is no necessity to describe these techniques in a greater detail. Following this, a set of predetermined points in the image, herein designated as critical points, are displaced 502 to coincide with predetermined locations. A set of critical points is determined for each basic morphological class. As a concrete example, the morphological class "EYE" has two (2) critical points representing the position of the center of each eye. Therefore, each basic morphological elements in the "EYE" class has two (2) critical points which are displaced to coincide with predetermined positions. As another concrete example, the morphological class "NOSE" has a single critical point representing the position of the tip of the nose. Following this, the position of non-critical points is determined through an interpolation operation 504 based on the displacement of the critical points. Alternatively, all the points associated with an element are displaced in the same way as the critical point. The principles of interpolation and of critical points are well-known in the art to which this invention pertains. The calibration operation 408 may alternatively be performed using a drawing tool such as Microsoft Photoshop or other similar image editing tools.

Following the calibration step 408, the gender specific features of the basic morphological elements are reduced 410. By making the basic morphological elements non gender specific, the size of the library can be reduced while providing a large number of possible facial images. As mentioned previously in the specification, favorable results have been found by considering eyes and eyebrows as two distinct classes. Effectively, eyebrow shapes and the manner in which they were plucked in certain faces were found to contain a substantial amount of gender information. Therefore by separating the eyebrows and the eyes, male eyes can be used on a female face and vice versa. This separation of eyes and eyebrows was performed at the isolation of basic morphological elements step 404. Another operation performed to make the basic morphological elements is the elimination of makeup and facial hair. Beards, mustaches and others may be added as separate basic morphological elements. In the preferred embodiment, elements of the morphological classes including gender specific characteristics are processed to remove the characteristics. The processing included applying filters to eliminate these characteristics. Items such as makeup are removed by varying the color of the region concerned such as the lips, the eyelids and the cheeks. In the preferred embodiment where the image is in gray scale, the image is darkened or lighten until the desired appearance is achieved. For example, Photoshop's "burn tool" and "dodge tool" can be used to edit the basic morphological elements. Alternatively, the pixels of the basic morphological element images may be individually corrected to yield the desired result.

Following the processing of each basic morphological element, a mask is used to cut the element in a shape suitable for its use in the composite picture system. A mask of the same configuration is applied to all components of a given class. Preferably, the masks shapes and sizes of the various morphological classes are chosen such that when elements of the classes are combined, the contour of the face is continuous. New components may be added to the library of basic morphological elements by performing the processing operations described above.

In the preferred embodiment, after the library of basic morphological elements is created, each facial component is identified with a unique identifier, herein referred to as a element code. The element codes are stored on a computer readable medium in the database of element codes 106. Typically, the element code is a sequence of alphanumeric characters. In the preferred embodiment, the element code includes both information about the basic morphological element type and about its position in the facial image. For example, the portion of the element code referring to the element type may be a class number followed by the element number. For example, if the morphological class "EYE" is designated with the number 23, then all the basic morphological elements representing eyes would be given element codes beginning with 23 followed by an identifier specific to the element such as "2301", "2345" and so on. If the morphological classes contain subclasses, the element code may further contain an identifier describing the subclass. Other schemes are possible for identifying the basic morphological elements and methods other than the ones presented above do not deter from the spirit of the invention provided the element type portion of the element code is unique. The position portion of the element code reflects the X,Y coordinate of a predetermined point in the image. Preferably, all basic morphological elements in a given basic morphological class are given the same default coordinates and therefore the same position portion value. For example, if the default value for the elements of the "EYE" morphological class is coordinate (34, 123), then the element code for the components may be "2301x34y123", "2345x34y123" and so on. Alternatively, the position portion value may be expressed as an offset of the default value. Other schemes are possible for expressing the position of the elements and methods other than the ones presented above do not deter from the spirit of the invention. The coordinate values for the horizontal and vertical positions can be later modified using the vertical and horizontal controls of the user interface. Preferably, limit values for the X and Y positions are also stored in order to limits the motion of the elements such that the faces created from the combination of the elements are a substantially realistic representation of a human face. The table below shows a possible arrangement of the database of element codes for three morphological classes. In this arrangement the individual morphological elements are given a unique alphanumeric label within their class.

|  | "EYE" | "NOSE" | "MOUTH" |
| --- | --- | --- | --- |
| Code | 23 | 45 | 52 |
| X default position | 34 | 34 | 34 |
| Y default position | 123 | 80 | 50 |
| X range | 32–36 | 32–36 | 30–38 |
| Y range | 117–130 | 70–90 | 45–55 |

A facial code for a facial image may be created by combining the element codes of the basic morphological elements constituting the facial image. The combination may be a concatenation or any other means of combining the identifiers provided that the resulting facial code is unique to that set of basic morphological elements and their coordinates. The facial code allows each facial image to be described with a very small number of characters permitting the rapid transmission of the composite picture over data lines. For example, a police station A using the facial code can transmit the entire composite picture of a suspect to police station B by simply sending the code for that facial image either verbally or through an electronic communication means. At the reception, police station B enters the code into the composite picture system that displays the composite picture. The electronic communication between location A and location B may be a telephone line with a set of modems, and Ethernet connection or any other communication means suitable for the transfer of data.

Once the basic morphological elements have been processed by the method described above in this specification, the images are stored on a computer readable medium. Preferably, the images are compressed in a format suitable for graphical storage such as a bitmap (BMP), GIF of JPEG file format. Other file formats may be used here without detracting from the spirit of the invention. The element codes are stored along with the elements or in a separate location. Alternatively, the basic morphological elements are printed on transparencies.

An example of a typical interaction will better illustrate the functionality of the image creation and modification module implemented by the program instructions 102 of composite picture system and using the data components 104 106.

Figure 2:
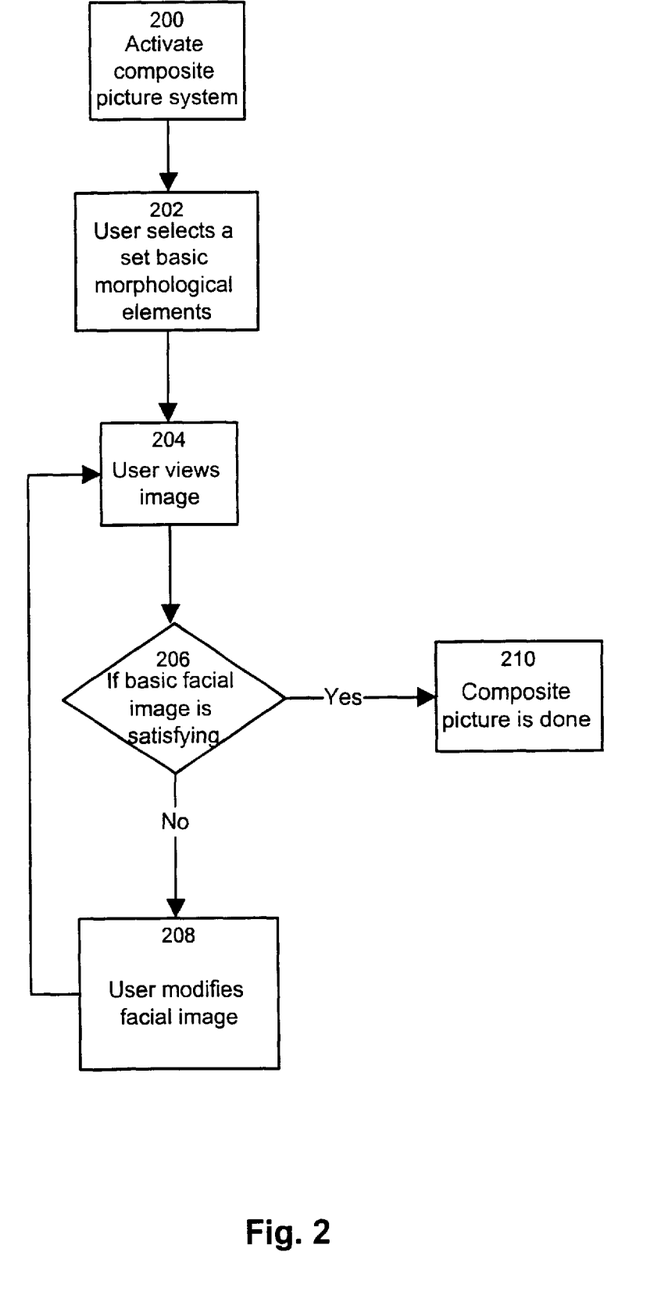
FIG. 2 is a flow chart of a process for creating a composite picture with the system depicted in FIG. 1.

In a typical interaction, as shown in FIG. 2, once the composite picture system is activated 200, the user selects a set of basic morphological elements 202 through a user interface. The interface to the composite picture system may be a keyboard, pointing device, touch screen or any other suitable input means. Once the system has received the request, it locates in the library of basic morphological elements, the entry corresponding with the received input. The received input may be an address of the memory location where the basic morphological element is located or some other way of identifying it. Preferably for a given facial image, a single basic morphological element is selected from a given morphological class. When an element is selected it is considered to be active. For example, for each facial image a single element from the "EYE" class will be active, a single element from the "MOUTH" class will be active and so on. In the event that more than one basic morphological element from the same morphological class is selected, only the one selected last is active. However, all morphological classes do not need to have an active element in a given facial image. For example, a facial image may not have any active elements from the "MOUSTACHE" class. Following this, the selected basic morphological elements are combined to form a facial image. The combination is performed by position each active basic morphological element in a same frame at its default location. Preferably, as previously described, all elements of a given morphological class have the same default position specified in the database of element codes. In the preferred embodiment, spaces in between basic morphological elements are uniformly filled by a predetermined tone, herein referred to as the universal skin tone. The system then displays the facial image to allow the user to view it 204. Alternatively, after each selection of a basic morphological elements, the systems displays it to allow the user to view the image as it stands with the current selection of elements. If portions of the basic morphological elements overlap, the overlapping portion with the darkest color is displayed. At condition 206, if the user is satisfied with the appearance of the facial image, the composite picture is complete 210 and the user may make use of it as he pleases. In the event that the user is not satisfied with the appearance of the facial image, condition 206 is answered in the negative and the user may modify the facial image 208. The modification of the facial image may comprise different operations. For example, the user may replace a basic morphological element by another of the same class; he may remove an element all together; the element may be displaced in the vertical or horizontal direction; characterizing traits and accessories such as wrinkles, glasses and sun glasses may be added or removed. It is also desirable to allow the user to specify the universal skin tone he desires for a particular facial image. In the preferred embodiment the user can lighten or darken the current skin tone of the facial image. Once the facial image has been modified by selecting a revised set of basic morphological elements, the latter are combined to form a facial image. In the preferred embodiment, spaces in between basic morphological elements are uniformly filled by a predetermined tone, herein referred to as the universal skin tone. The system then displays the facial image to allow the user to view it at step 204. Alternatively, after each selection of a basic morphological elements, the systems displays it to allow the user to view the image as it stands with the current selection of elements. The process continues until the user is satisfied with the image and condition 206 is answered in the affirmative the composite picture being done 210.

Figure 3:
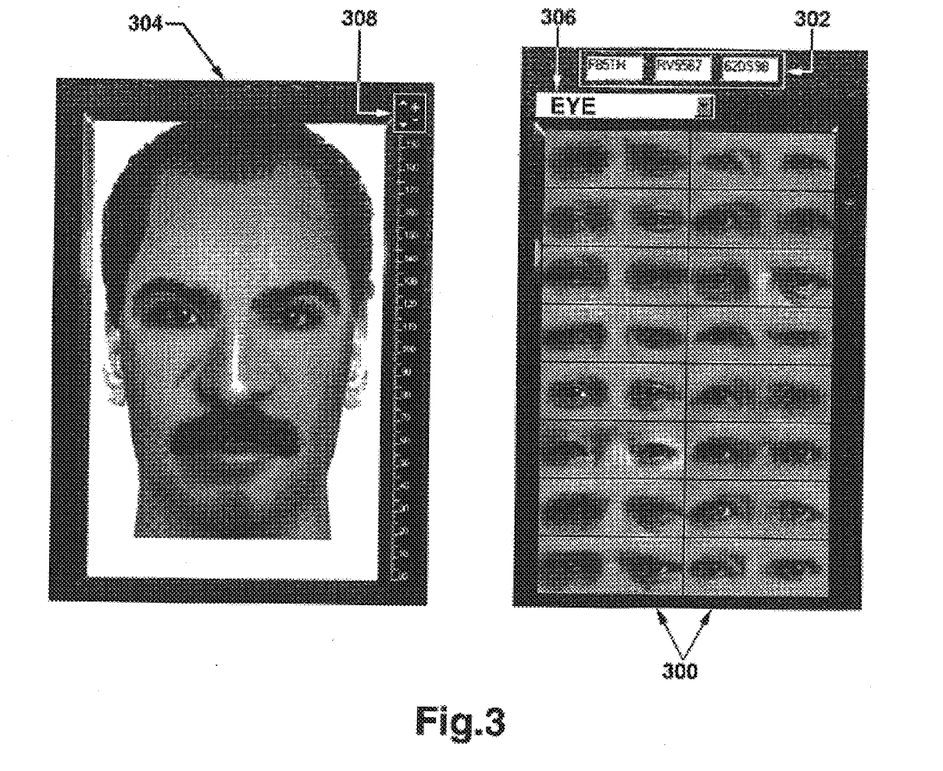
FIG. 3 shows an example of a user interface of the system of FIG. 1.

In the preferred embodiment, the image creation and modification module includes a user interface allowing the user to view the facial image being created. The facial image is created in a gray shade and displayed in gray shade in the user interface. An example of an embodiment of the user interface is shown in FIG. 3. Preferably, the user interface also allows a user to view various basic morphological elements in the library of basic morphological elements through a window 300. Preferably, the user is permitted to select which morphological class 306 he wishes to look at and views a subset of the elements in the class. In FIG. 3, the "EYE" morphological class was selected 306 and elements representing eye images are displayed 300. Using an input device such as a keyboard, pointing device or other suitable means, the user may indicate the basic morphological element he wishes to add or replace in the facial image 304 by pointing to the image he desires. The facial image 304 is update to reflect the current status of the selection of basic morphological elements. Alternatively, the composite picture system may receive as input an alphanumeric representation of the facial image, herein designated as the facial code, describing the components and their position on the facial image. Using this facial code, the composite picture system reconstructs the facial image. Therefore, the user interface may also include a means for entering the element code and facial codes 302. The facial code is a unique alphanumeric sequence describing the elements and their position in a facial image. The description of the facial code will be described later on in the specification. Optionally, the user interface includes a means, such as arrows in the user interface, for displacing the basic morphological elements 308 in the vertical and horizontal directions. The arrows are linked to active modules that modify the position of the selected image in the screen. When the element is displaced, the element code is also modified such as to reflect to current positioning of the element. In a typical interaction the user selects via a pointing device or other input means the element he wishes to displace in the facial image. The user then uses the displacement arrows 308 to position the element in the desired position in the facial image. Many variations in the user interface are possible and implementations different from the one presented above do not detract from the spirit of the invention.

In another preferred embodiment, the non-electronic system for generating a composite human face is implemented using transparencies where the basic morphological elements are printed. The basic morphological element images are preferably processed by a general-purpose digital computer in the manner described above in this specification before being transposed onto transparencies. The complete facial image is composed by selecting transparencies from a library of transparencies containing the illustrations of the basic morphological elements and superposing them. Optionally, the system further includes a device for visualizing the facial image such as an overhead projector device.

The composite picture system may readily be used in law enforcement for witnesses to create their own depictions of suspects, in art school for students to understand how differences in facial features are manifested in overall appearance and in recreation for users to create faces that they find interesting or amusing. The composite system may also be a subsystem of some other system. The use of the composite system in situations other than the ones described above does not detract from the spirit of the invention.

Although the present invention has been described in considerable detail with reference to certain preferred versions thereof, other versions are possible. For example, the method and apparatus described may be used in a system to create images of cartoon characters. In this type of application the library of basic morphological elements would include the appropriate set of images. The construction and manipulation are similar to that presented above. System as the one presented above may also be used as educational tools or as a recreational or artistic tool to teach children how to create composite images. Artistic tools may require additional artifacts such as earrings, glasses and other articles that may be useful to complete the images. Therefore, the spirit and scope of the appended claims should not be limited to the description of the preferred versions contained herein.

The reader's attention is directed to all papers and documents which are filed concurrently with or previous to this specification in connection with this application and which are open to public inspection with this specification, and the contents of all such papers and documents are incorporated herein by reference.

What is claimed is:

1. An apparatus for generating a composite facial image, said apparatus comprising:
   a) a machine-readable storage medium storing graphical representations of basic morphological elements, said graphical representations being proportionate to one another and having respective boundaries, the graphical representations of basic morphological elements including skin components around their respective boundaries, the skin components having skin tones substantially similar to one another;
   b) an input for receiving user data indicative of a set of data elements, each data element in said set of data elements being associated to a respective graphical representation of a basic morphological element in the machine-readable storage medium;
   c) a processing unit in operative relationship with said machine-readable storage medium, said processing unit being operative for:
      i. processing the set of data elements to locate in the machine-readable storage medium corresponding graphical representations of basic morphological elements, and
      ii. combining the graphical representations of basic morphological elements located to generate a digital representation of a facial image, at least two graphical representations being combined such that their skin components having substantially similar skin tones meet at a boundary; and
   d) a display unit in operative relationship with said processing unit for displaying the digital representation of the facial image.

2. The apparatus as defined in claim 1, wherein said graphical representations of basic morphological elements are grouped in a plurality of morphological classes.

3. The apparatus as defined in claim 2, wherein graphical representations of basic morphological elements belonging to a given morphological class have substantially similar dimensions.

4. The apparatus as defined in claim 3, wherein the digital representation of the facial image includes a single graphical representation of a basic morphological element of a given morphological class.

5. The apparatus as defined in claim 1, wherein said display means is a screen.

6. A method for generating a composite facial image, said method comprising the steps of:
   a) providing a machine-readable storage medium for storing graphical representations of basic morphological elements, said graphical representations being proportionate to one another and having respective boundaries, the graphical representations of basic morphological elements including skin components around their respective boundaries, the skin components having skin tones substantially similar to one another;
   b) receiving user data indicative of a set of data elements, each data element in said set of data elements being associated to a respective graphical representation of a basic morphological element in the machine-readable storage medium;
   c) processing the set of data elements to locate in the machine-readable storage medium corresponding graphical representations of basic morphological elements;
   d) combining the graphical representations of basic morphological elements located to generate a digital representation of a facial image, at least two graphical representations being combined such that their skin components having substantially similar skin tones meet at a boundary; and
   e) displaying the digital representation of the facial image on display means.

7. The method as defined in claim 6, wherein said graphical representations of basic morphological elements are grouped in a plurality of morphological classes.

8. The method as defined in claim 7, wherein graphical representations of basic morphological elements belonging to a given morphological class have substantially similar dimensions.

9. The method as defined in claim 8, wherein the digital representation of the facial image includes a single graphical representation of a basic morphological element of a given morphological class.

10. A computer-readable storage medium containing a program element for directing a computer to create a facial image, said computer including:
    a) a memory unit including a set of graphical representations of basic morphological elements, said graphical representations being proportionate to one another and having respective boundaries, the graphical representations of basic morphological elements including skin components around their respective boundaries, the skin components having skin tones substantially similar to one another;
    b) a processor unit in operative relationship with said memory unit, said program element instructing said processor unit for:

i. receiving user data indicative of a set of data elements, each data element in said set of data elements being associated to a respective graphical representation of a basic morphological element in the computer-readable storage medium, ii. processing the set of data elements to locate in the computer-readable storage medium corresponding graphical representations of basic morphological elements, and iii. combining the graphical representations of basic morphological elements located to generate a digital representation of a facial image, at least two graphical representations being combined such that their skin components having substantially similar skin tones meet at a boundary; and c) a display unit in operative relationship with said processor unit for displaying the digital representation of the facial image.

11. The computer-readable storage medium as defined in claim 10, wherein said graphical representations of basic morphological elements are grouped in a plurality of morphological classes.

12. The computer-readable storage medium as defined in claim 11, wherein graphical representations of basic morphological elements belonging to a given morphological class have substantially similar dimensions.

13. The computer-readable storage medium as defined in claim 12, wherein the digital representation of the facial image includes a single graphical representation of a basic morphological element of a given morphological class.

14. A computer-readable storage medium comprising a set of graphical representations of basic morphological elements, said graphical representations being proportionate to one another and having respective boundaries, the graphical representations of basic morphological elements including skin components around their respective boundaries, the skin components having skin tones substantially similar to one another, said graphical representations of basic morphological elements being grouped in a plurality of morphological classes, graphical representations of basic morphological elements belonging to a given morphological class having substantially similar dimensions.

15. A computer-readable medium comprising computer-executable instructions for directing a computer to implement a graphical user interface for creating a facial image, said computer including:

a) a memory unit for storing a plurality of graphical representations of basic morphological elements, said graphical representations being proportionate to one another and having respective boundaries, the graphical representations of basic morphological elements including skin components around their respective boundaries, the skin components having skin tones substantially similar to one another; and b) a processor unit in operative relationship with said memory unit, said computer-executable instructions instructing said processor unit for generating a graphical user interface for:

i. displaying at least some of the plurality of graphical representations of basic morphological elements, ii. providing means for enabling a user to select a set of graphical representations of basic morphological elements from the at least some of the plurality of graphical representations of basic morphological elements displayed in the user interface, and iii. combining and displaying the graphical representation of basic morphological elements selected to generate a digital representation of a facial image, at least two graphical representations being combined such that their skin components having substantially similar skin tones meet at a boundary.

16. A method for generating an electronic library of basic morphological elements suitable for usage in a composite picture system, said method comprising the steps of:

a) providing a plurality of facial images;

b) digitizing the facial images;

c) processing the digitized facial images to create a plurality of graphical representations of basic morphological elements of a certain facial image, said graphical representations of basic morphological elements including skin components having different skin tones;

d) applying a filtering process to said graphical representations of basic morphological elements to derive modified graphical representations, the modified graphical representations including skin components having skin tones substantially similar to one another;

e) processing said modified graphical representations to generate calibrated graphical representations, said calibrated graphical representations being substantially proportional to one another; and f) storing the calibrated graphical representations on a computer-readable storage medium.

* * * * *